United States Patent [19]
Berthold

[11] 3,725,666
[45] Apr. 3, 1973

[54] ELECTRO-OPTICAL DETERMINATION OF WEAR OF PAPER MAKING SCREEN

[76] Inventor: Rainer Berthold, Zum Jungenstr. 16, Frankfurt am Main, Germany

[22] Filed: June 17, 1968

[21] Appl. No.: 737,702

[52] U.S. Cl........250/219 DF, 250/219 WE, 356/200
[51] Int. Cl..........................G01n 21/16, G01n 21/32
[58] Field of Search.............................250/219 F, 250/219 WE, 219 S, 19 TH; 356/120, 199, 200, 209, 212, 237

[56] References Cited

UNITED STATES PATENTS

| | | |
|---|---|---|
| 2,427,753 | 9/1947 | Vose et al.............................250/219 |
| 3,357,557 | 12/1967 | Austin...................................356/120 |
| 3,404,282 | 10/1968 | Walker..................................250/219 |
| 2,947,212 | 8/1960 | Woods...................................250/219 |
| 3,427,109 | 2/1969 | Beattie et al..........................250/219 |

Primary Examiner—James W. Lawrence
Assistant Examiner—T. N. Grigsby
Attorney—Ray H. Siegemund

[57] ABSTRACT

Wear of paper making screen is determined by utilizing increased abraded areas of screen wires for greater reflection of a light beam directed on moving screen. The reflected general beam may also be shifted by reduced thickness of the screen to further affect output of a light sensor, positively on negatively, for comparisons in order to reduce error due to dirty instrument components.

6 Claims, 4 Drawing Figures

ELECTRO-OPTICAL DETERMINATION OF WEAR OF PAPER MAKING SCREEN

BACKGROUND OF THE INVENTION

1. Field of the Invention

Non-contact measurement of wear of wire screen by means of reflected light measurement.

2. Description of the Prior Art

Paper making machines require the use of costly wire screens, usually of bronze or costly alloys, and in order to reduce costs of operation it is necessary to utilize the screen to its maximum safe life. Hence observation and evaluation of the degree of abrasion of the screen wires are the rule. Simple visual inspection is liable not to be purely objective.

It has been proposed to measure the thickness of wires of the screen from time to time by a micrometer and to compare the measurement of total wear with experience tables empirically developed. Usually in quite a number of instances the wear of the wires is observed by an eye loop. In some cases plasticine impressions of the screen are taken and measured directly on a microscope or a micro image is made photographically and enlarged for the measurement.

In all the above processes the measuring is discontinuous, and can only be done by skilled personnel and while the machine is stopped. As a result, the methods were generally neglected and the screws were replaced largely in accordance with personal good judgment.

It has been proposed to avoid the above difficulties by the use of devices utilizing (gamma) rays from radioactive elements. But these devices are very expensive, and owing to their use of dangerous radiation there are many special precautions necessary. Hence these devices can be used only under severely limited conditions though they do have the advantage of being able to make measurement while the screen is in motion.

The above drawbacks of the prior art are overcome by the present invention.

SUMMARY OF THE INVENTION

In the operation of the invention, a light beam is directed at a predetermined angle upon the surface of screen web wires subject to abrasion or wear and a portion of the beam is reflected by the abraded area. This portion is measured by conventional means. When the reflected light reaches a predetermined amount at a sensor, corresponding to the highest permissible degree of abrasion of the screen wires, a danger signal is given out. The amount of light reaching the sensor may depend only on the increased reflective areas of individual round wires as they wear flat, and/or the shift of the reflected rays as the screen becomes thinner.

DESCRIPTION OF THE PREFERRED EMBODIMENTS

Figure 1:
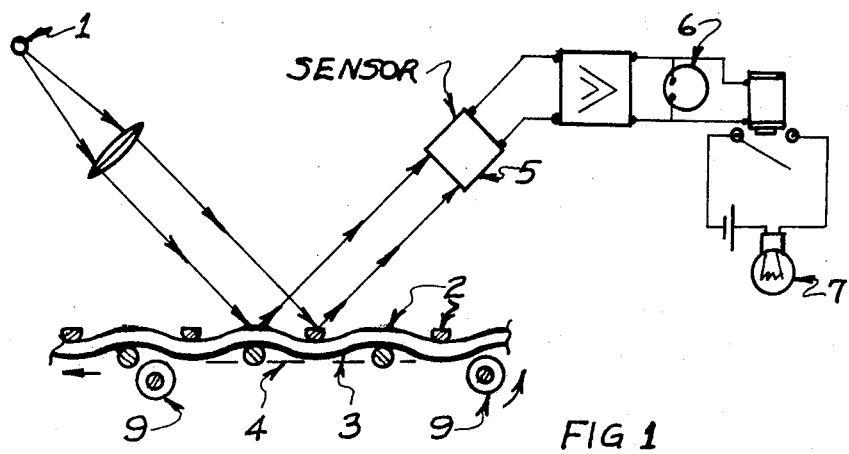
FIG. 1 shows one way for carrying out the process.

The process may be carried out by well known elements. As shown in FIG. 1, rays from a source 1 fall at a predetermined angle of incidence on the worn surfaces 2 of the round wires 3, these surfaces being approximately flat and parallel with the plane of the screen 4 at the zone of measurement. Even though the surfaces may not wear exactly as flat surfaces, for some abrasion is at the sides of the wires, a greater area approximating a flat surface is produced as the wires wear. Thus the average amount of reflection in a certain direction increases with the extent of abrasion. The amount of reflected light from a substantially constant size sample area of the screen, as opposed to the changing abraded area of a single wire, is measured by a photoelectric sensor 5. The output of the sensor is measured by a meter 6 and when the output reaches a predetermined value, a signal such as by a lamp 7 is given. This predetermined value can be arrived at by experiment to correspond to the maximum degree of abrasion that still affords safe use.

While the life of a screen is influenced by a number of conditions, it has been found that screens customarily used need not be changed until the abrasion loss reaches about 58 percent.

In general, the direction of the incident beam relative to the direction of travel of the wires is immaterial, i.e. transverse or longitudinal of the screen belt, and the configuration of the weave is generally not crucial.

As can be experimentally shown the measured values of reflected light are directly proportional to and linearly dependent on an average value of abraded area of the wires of the screen. The average value is a function of the screen thickness at rest or the absolute amount of abrasion of the screen wires.

Figure 2:
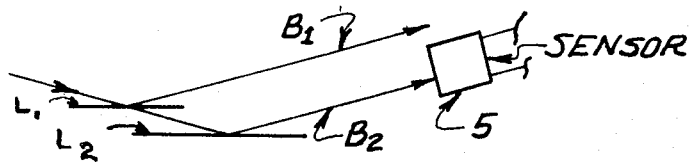
FIG. 2 shows another way for carrying out the process.

While the invention as illustrated in FIG. 1 utilizes rays falling at a steep angle on the screen so that the location of the reflected rays is not materially shifted as the abraded surfaces are lowered, rays making a much smaller angle may be used as in FIG. 2 to produce such a shift. As schematically shown, wearing of the screen may shift the reflected rays relative to the sensor from position $B_1$ to $B_2$ so that the beam becomes more and more nearly alined with the sensor so that the output is dependent in two additive ways on wear.

Figure 3:
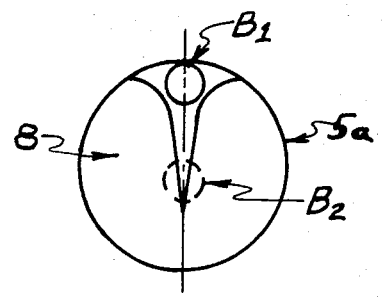
FIG. 3 shows an end of a modified light sensor for use in FIG. 2.

By the use of especially shaped trimmers or masks 8 interposed between the screen and sensor 5a in FIG. 3 to reduce the light reaching the sensor due to shift, and by the same amount the light increases due to greater reflection from the wires, the output of the sensor of FIG. 2 can be made to remain constant as the wires wear. If the readings of meter 6 are found to diminish, when they should remain constant, dirty lenses or glasses are likely to be the cause.

Figure 4:
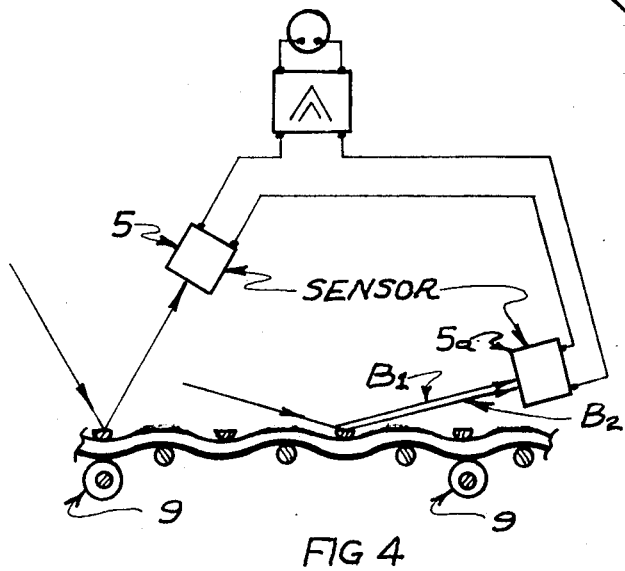
FIG. 4 shows a process utilizing the process of FIG. 1 and the process of FIG. 2 for compensation for dirty optical elements.

If the readings of two instruments measuring essentially the same screen zones, one instrument having a sensor for normally constant output as described, and the other either as shown in FIG. 1 or with additive output due to the beam shift, are compared then the error due to dirt can be greatly reduced. The comparison may be by simple comparison of two meter readings. By using two polarized sensors connected in opposition, only one meter is needed to give the corrected reading as shown in FIG. 4.

The beam should fall on a sufficiently large area of the screen if the screen is in motion so that the reflection is not too much of an intermittent nature unless the meter 6 reads average values. Support rollers 9 are desirable when readings are based on beam shift, and for maintaining the lower face of the screen in a substantially fixed plane.

I claim:

1. A method for the continuous non-contact indication of the wear of a paper-making machine wire screen, the wires of the screen being substantially round wires, the wear on the screen being attended by the formation of generally flat reflective co-planar surface areas on the wires, with the area of the approximately flat surfaces increasing with the wear of the wires, said method comprising:

directing a light beam from a constant source onto the screen at a predetermined angle to strike areas of wear on the screen so that the incident light on the areas is reflected by the worn areas toward a fixed positioned light sensor;

monitoring the amount of light reaching the sensor, the beam being sufficiently large to strike a representative sample of the screen, said screen being of low reflectability toward the sensor when the wires are not worn so that wires not worn produce substantially no light incident on the sensor, the area of the approximately flat surfaces increasing with the wear of the wires thereby providing increasing degree of reflection of the constant beam, with increasing wear, the output of the sensor being dependent on the size of the area of wear on the wires in said sample; and maintaining the face of the screen opposite the reflective areas of wear in a substantially fixed plane.

2. A method as claimed in claim 1, including providing a signal when a predetermined amount of light impinges on the sensor.

3. A method as claimed in claim 1, wherein said beam from the constant source is made to strike the screen at a small angle so that the axis of the reflected beam is substantially shifted as the wires of the screen are worn down in order to vary the portion of the reflected beam impinging on the sensor.

4. A method as claimed in claim 1 wherein the beam is made to strike the screen at a steep angle so that the axis of the beam is not substantially shifted as the wires become worn down.

5. A method as claimed in claim 4 including directing a second beam on a like representative sample of the wires of the screen at a small angle so that the reflection of the second beam shifts with the wear of the wires, blocking a portion of the reflection of the second beam according to the amount of shift for varying such reflection in a predetermined manner, sensing with a second sensor the amount remaining after blocking, and comparing the outputs of the two sensors for an indication of wear by both beam shift and by degree of reflectability of the wires.

6. A method as claimed in claim 5, the degree of blocking being substantially proportional to increased reflection of the first mentioned beam due to wire wear.

* * * * *